(12) United States Patent
Aihara et al.

(10) Patent No.: US 6,258,440 B1
(45) Date of Patent: Jul. 10, 2001

(54) CERAMIC PARTS AND A PRODUCING PROCESS THEREOF

(75) Inventors: Yasufumi Aihara; Shinji Kawasaki, both of Nagoya (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,346

(22) Filed: Dec. 2, 1997

(30) Foreign Application Priority Data

Dec. 5, 1996 (JP) .................................................. 8-339103

(51) Int. Cl.$^7$ .............................. B32B 3/26; H01L 21/205
(52) U.S. Cl. ...................... 428/141; 428/698; 428/702; 428/409; 428/410; 428/220; 264/600; 264/662; 264/665; 264/668; 264/678; 264/681; 219/385; 219/553; 392/416; 118/725
(58) Field of Search ..................................... 428/141, 698, 428/702, 409, 410, 220; 264/600, 662, 665, 668, 678, 681; 219/385, 553; 392/416; 118/725

(56) References Cited

U.S. PATENT DOCUMENTS 3,791,861 * 2/1974 Sundahl, Jr. ......................... 117/213
4,681,538 * 7/1987 DeLucca et al. ........................ 433/9

FOREIGN PATENT DOCUMENTS

| 0 567 686 A2 | 11/1993 | (EP) . |
| 0 653 395 A1 | 5/1995 | (EP) . |
| 3-228502 | * 3/1991 | (JP) . |

OTHER PUBLICATIONS

Database WPI; Section Ch, Week 9211; Derwent Publications Ltd., London, GB; XP002086142 & JP 04 026546 A (NGK Insulators Ltd); Jan. 29, 1992 *abstract*.

Database WPI; Section Ch, Week 9147; Derwent Publications Ltd., London, GB; Class L02, AN 91–343117 XP002086143 & JP 03 228502 A (Mitsubishi Materials Corp); Oct. 9, 1991 *abstract*.

* cited by examiner

Primary Examiner—William P. Watkins, III
(74) Attorney, Agent, or Firm—Parkhurst & Wendel, L.L.P.

(57) ABSTRACT

A sintered ceramic part to be exposed to a corrosive gas, a surface of said ceramic part being machined, wherein each of grains exposed to the machined surface of the ceramic part is formed with a machined surface, and en edge of the machined surface of each of these grains is made round by material transfer. A process for producing such a sintered ceramic part includes the steps of: obtaining a machined body having a given shape by at least grinding a surface of a ceramic sintered body, and annealing the machined body.

11 Claims, 5 Drawing Sheets

FIG_3
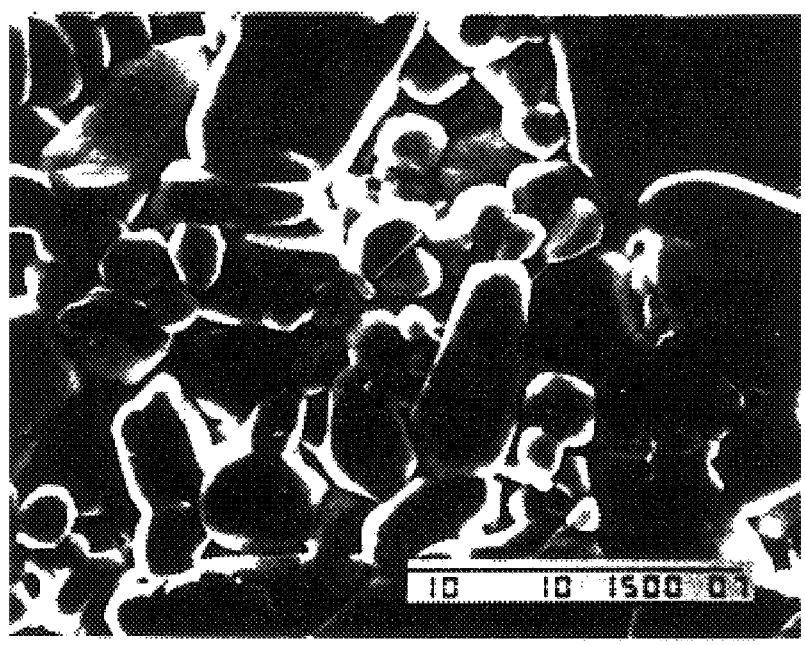
FIG_4
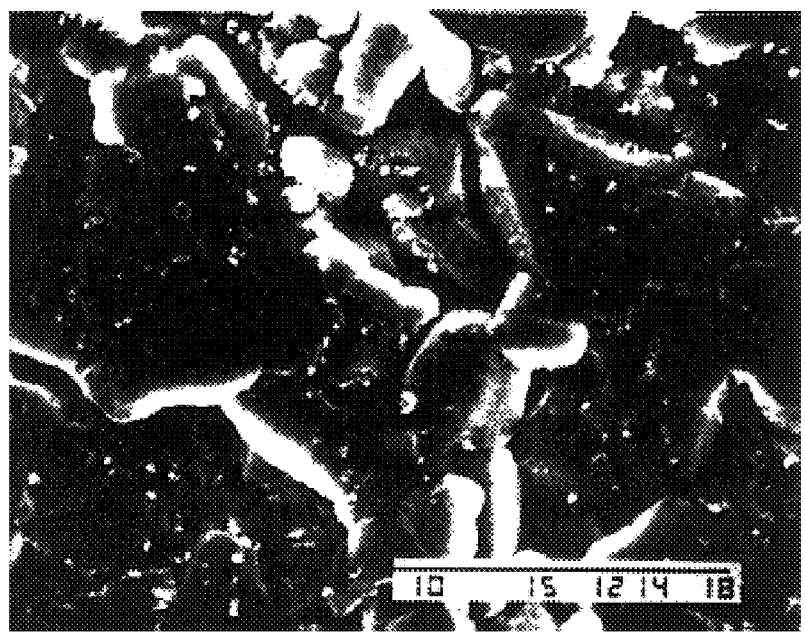

FIG_7a
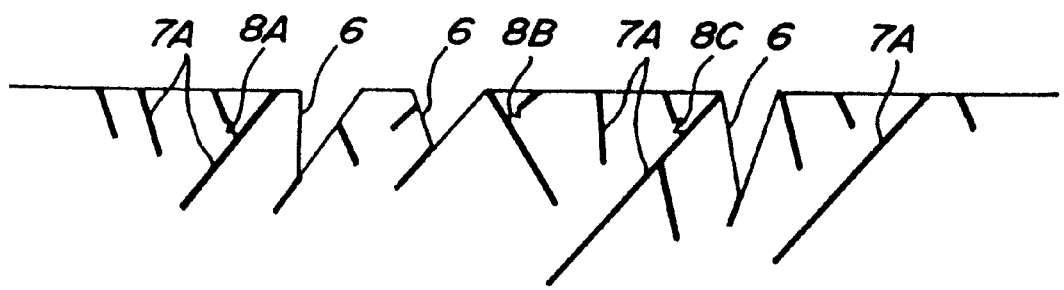
FIG_7b
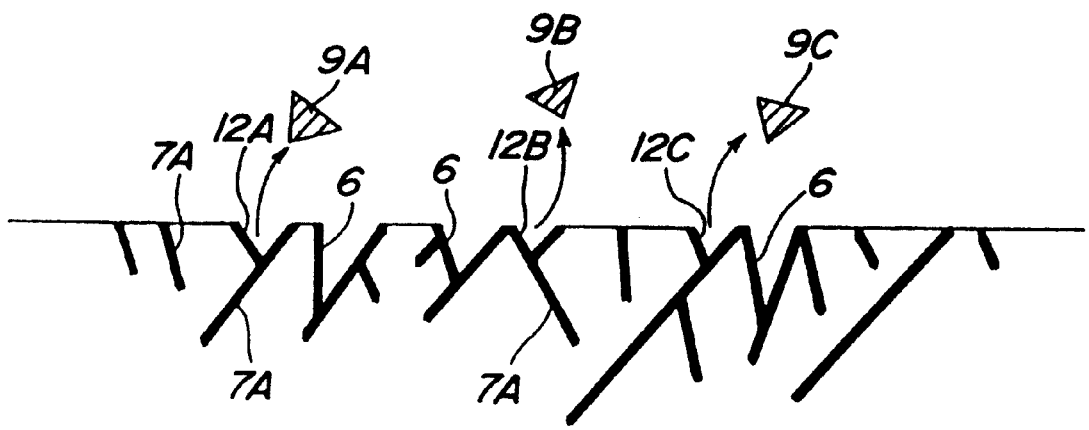

CERAMIC PARTS AND A PRODUCING PROCESS THEREOF

BACKGROUND OF THE INVENTION

1. Field of the Invention

The present invention relates to ceramic parts which are produced with resistive characteristics to be exposed to a corrosive gas as well as a process for producing the same.

2. Related Art Statement

In the semiconductor-producing apparatuses, halogen-based corrosive gases are used as an etching gas, a cleaning gas, etc. Since various parts used in the above atmospheres are exposed to the halogen-based corrosive gases such as $ClF_3$ or $NF_3$ or a plasma thereof, the parts need to be anti-corrosive against the halogen-based corrosive gases. As highly anti-corrosive materials, dense alumina and aluminum nitride are known. JP-A 5-251,365 describes that dense alumina and aluminum nitride have high corrosion resistive properties against the corrosive halogen-based gases.

The present inventors have been developing various parts made of dense alumina, which are to be placed inside of semiconductor-producing apparatuses. However, they encountered the following problem during their developing course. For example, when plasma was produced in an etching apparatus by using a halogen-based corrosive gas, particles came out from a dense alumina part.

The present inventors ground the surface of a dense alumina member, then mirror-polished and further cleaned the polished surface by brushing. However, particles were still generated when the halogen-based corrosive gas was flown.

SUMMARY OF THE INVENTION

An object of the present invention is therefore to provide ceramic parts to be exposed to corrosive gases, and is aimed at suppressing the occurrence of particles from the ceramic parts if they are exposed to corrosive gases. The present invention is to provide a process for producing such ceramic parts.

The present invention is directed to a sintered ceramic part to be exposed to a corrosive gas, said ceramic part having been machined, wherein ceramic grains exposed to a machined surface of the ceramic part have machined surfaces, and are made round through material transfer inside the grains.

The present invention is also directed to a process for producing a sintered ceramic part to or resistive to be exposed to a corrosive gas, said process comprising the steps of obtaining a machined body having a given shape by at least grinding a surface of a sintered ceramic body, and annealing the machined body.

These and other objects, features and advantages of the invention will be apparent from the following description of the invention when taken in conjunction with the attached drawings, with the understanding that some modifications, variations and/or changes of the same could be easily made by the skilled person in the art to which the invention pertains.

BRIEF DESCRIPTION OF THE DRAWINGS

For a better understanding of the invention, reference is made to the attached drawings, wherein:

FIG. 3 is an electron micrograph showing the machined surface of a dense alumina part as shown in FIG. 1 after being annealed at 1500° C.;

FIG. 4 is an electron micrograph showing the machined surface of a dense alumina part as shown in FIG. 3 after being thermally exposed to the halogen-based corrosive gas;

FIG. 7(a) and 7(b) are figures for diagrammatically illustrating the state of the ground surface 4 after being exposed to the halogen-based corrosive gas.

DETAILED DESCRIPTION OF THE INVENTION

As the corrosive gas, $CF_4$, $NF_3$, $ClF_3$, HF, HCl and HBr may be recited by way of example. Among $CF_4$, $NF_3$ and $ClF_3$, $ClF_3$ exhibits a particularly high F radical-dissociation degree, and has highest corrosiveness under the same temperature and the same plasma output.

For example, a semiconductor-producing apparatus member having a given shape and a given dimension is conventionally produced by first obtaining a sintered body from dense alumina or aluminum nitride, and then grinding the sintered body.

Figure 1:
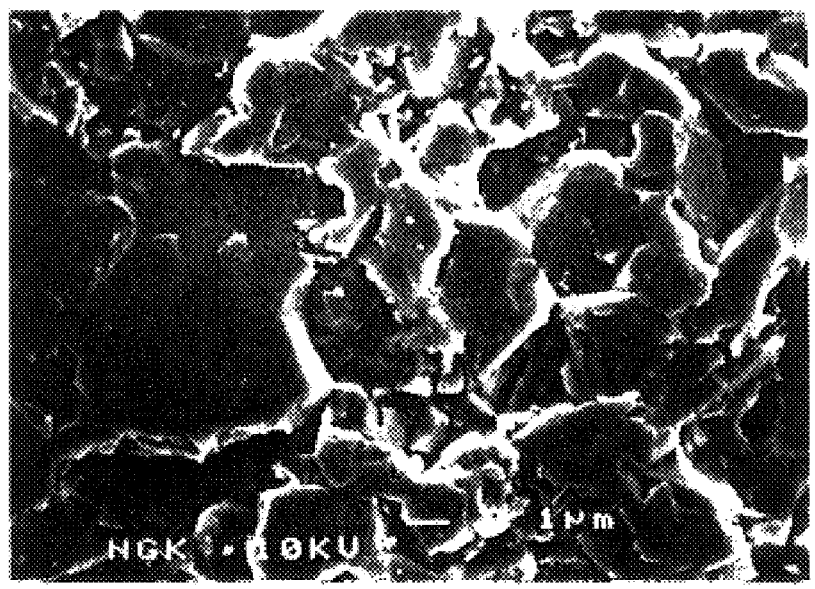
FIG. 1 is an electron micrograph showing the machined surface of a dense alumina part before being exposed to a halogen-based corrosive gas.
Figure 2:
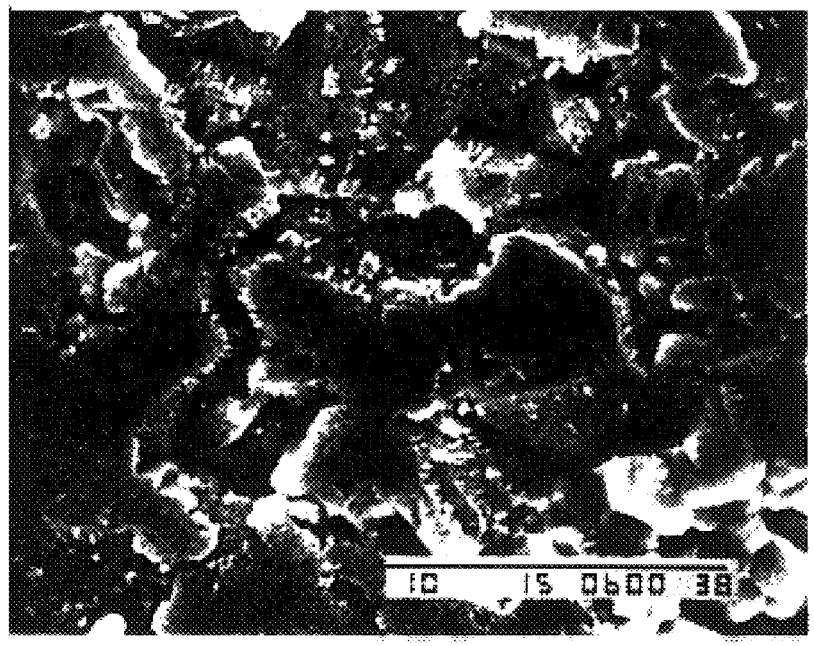
FIG. 2 is an electron micrograph showing the machined surface of a dense alumina part as shown in FIG. 1 after being exposed to the halogen-based corrosive gas.

The present inventors exposed dense alumina members to halogen-based corrosive gas by way of example. When particles were generated from the alumina member, the inventors observe the surface of the dense alumina member. FIG. 1 is an electron micrograph showing a machined surface of a dense alumina member before being exposed to the halogen-based corrosive gas. FIG. 2 is an electron micrograph showing the machined surface of the dense alumina member in FIG. 1 after being exposed to the halogen-based corrosive gas. Flat surfaces were formed on the grains at the surface of the dense alumina member by machining, the edges of the grains which are acute. From the photograph of FIG. 2, it is considered that corrosion proceeded from the edges of the flat surface of each grain.

In view of the above, the present inventors have discovered a method of obtaining a machined body having a given shape by at least grinding a surface of a sintered body and then annealing the machined body. The present inventors exposed the thus obtained ceramic parts to various corrosive gases, and found out that the generation of the particles were conspicuously suppressed. The inventors have reached the present invention based on the above knowledge.

The present inventors further observed the surfaces of the thus obtained dense alumina parts, and discovered that as shown in FIG. 3, edges of the machined surfaces of the grains exposed to the machined surface of the sintered, then machined bodies became round. After the dense alumina part in FIG. 3 was exposed to the halogen-based corrosive gas at high temperatures, the surface states thereof were observed. This revealed that as shown in FIG. 4, the progress of the corrosion of each grains was conspicuously suppressed.

Based on these knowledge, the present inventors have further examined a cause which generated the particles from the above ceramic parts, and obtained the following knowledge. For example, as diagrammatically shown in FIG. 6, the surface 2 of the sintered body 3 is a fired surface (as-fired surface). The surface 2 is ground, for example, by moving a rotary grinding stone 1 along the surface 2 while being rotated around its central axis 1a as shown by an arrow A.

When the thus machined bodies were exposed to the halogen-based corrosive gas, a number of particles were generated depending upon production lots. Analysis of the particles with an EDS (energy dispersive spectroscope) revealed that the particles were composed of the same alumina as that of the sintered body. Further, as shown in FIG. 2, gaps at grain boundaries and acute edges of the machined grains were observed. Thus, it is presumed that considerable machining damage remained at the machined surface of the machined bodies.

In addition, when a machined body having an average surface roughness (Ra) of 0.4 μm was exposed to the halogen-based corrosive gas, the Ra was increased to 0.6 μm. As a result, it is considered that microcracks formed during the machining propagates during when the machined body is exposed to the halogen-based corrosive gas, so that particles are peeled from the machined surface near the microcracks.

Figure 6:
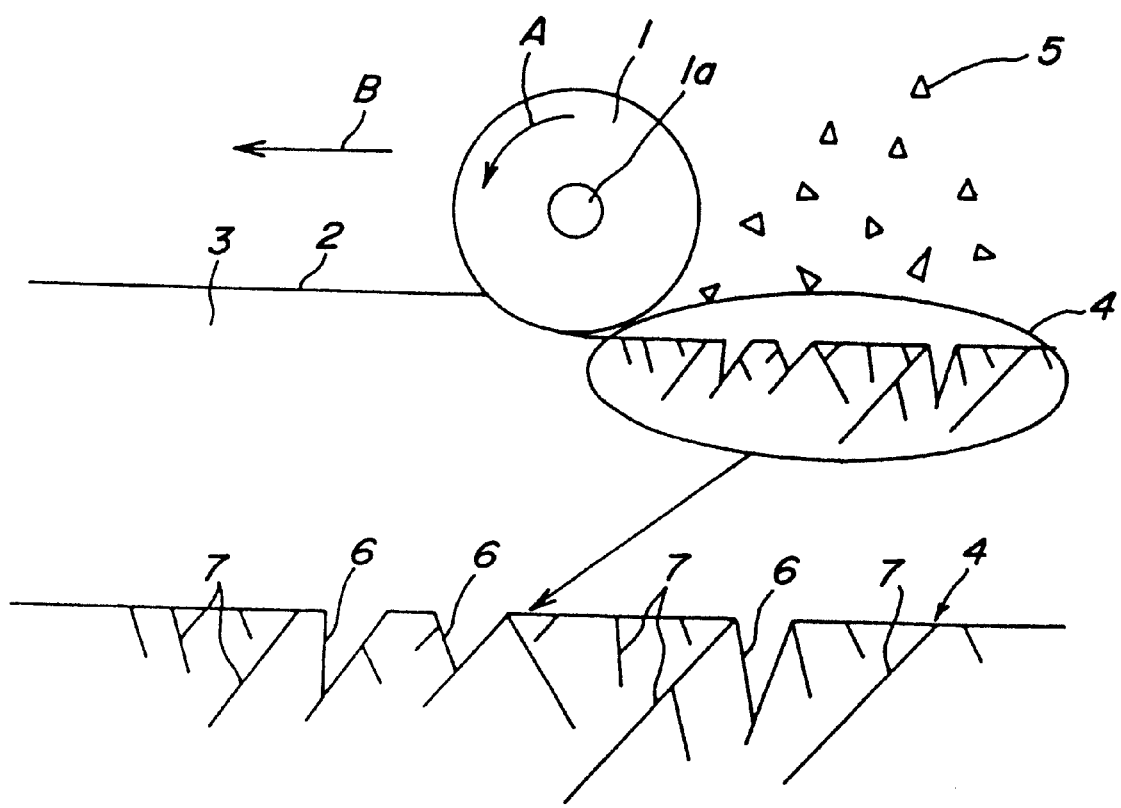
FIG. 6 is a figure diagrammatically illustrating a generation process of particles and microcracks at a machined surface 4 when a surface 2 of a sintered body 3 is ground by a rotary grinding stone 1.

This knowledge will be further explained with reference to the diagrammatic drawings in FIGS. 6 to 8. As mentioned above, as the rotary grinding stone 1 advances, a machined surface 4 is produced, and particles 5 are generated behind the rotary stone 1. When the machined surface 4 is magnified, it is seen that a number of fine microcracks 7 extend inwardly from a surface portion of the machined surface 4, whereas pits 6 remain. These pits 6 include pits originally present at the fired surface 2 and those formed by peeling particles from the surface during the grinding.

When the machined surface 4 is exposed to the halogen-based corrosive gas, there is a tendency that as shown in FIG. 7(a), corrosion proceeds to extend tips of microcracks 7A, for example, as shown by 8A, 8B, 8C and the microcracks 7A are combined. It is considered that as shown in FIG. 7(b), particles 9A, 9B and 9C are consequently peeled off from the machined surface, so that new pits 12A, 12B and 12C are formed. When FIG. 1 is compared with FIG. 2, it is considered that corrosion easily proceeds through combining of such microcracks and so on, from acute edges of the machined surfaces of the grains and their vicinities as starting points.

It is considered that by annealing the machined body according to the present invention, material transfer near the surface of each grain is promoted so that the edge of the machined surface of each grain is made round to remove such microcracks as causing generation of peeled particles.

For this reason, the annealing temperature of the machined body depends upon the sintering temperature of the sintered body to be machined, but the annealing temperature must be not less than a temperature at which the material transfer starts inside and at the surfaces of the grains exposed to the machined surface of the machined body.

More specifically, the above annealing temperature is set preferably at not less than (To−300)° C., more preferably at not less than (To−200)° C. in which To is the sintering temperature of the sintered body. By so doing, the material transfer which is sufficiently effective in suppressing the occurrence of the grains proceeds inside and at the surfaces of the grains exposed to the machined surface of the machined body.

Further, when the above annealing temperature is set at not more than To, decrease in the dimensional precision of the ceramic parts due to dimensional shrinkage of the ceramic parts is small, and the center line depth Rp in a roughness curve does not excessively increase. From this point of view, it is more preferable that the annealing temperature is set at not more than (To−100)° C. In the thermal treatment, only the surface of the machined body may be annealed by irradiation with laser beam.

It is known that the mechanical strength of a silicon carbide sintered body or a silicon nitride sintered body is enhanced by annealing the sintered body (See JP-A 60-81, 076, JP-A 61-178,472). However, these sintered bodies are annealed to increase strength of the silicon carbide or the silicon nitride sintered body. In addition, neither silicon carbide nor silicon nitride have corrosion resistance against the corrosive gas, particularly neither have corrosion resistance against the halogen-based corrosive gas at high temperatures. Therefore, the above annealing cannot be applied to the ceramic parts at which the present invention is aimed.

The present inventors ground a dense alumina sintered body, and observed it with an electron microscope. As shown in FIG. 1, acute edges are indeed seen at the machined surfaces of the grains, but microcracks themselves are hardly seen. However, when the machined body is heated at 1200° C., fine cracks and numerous grain boundaries come to appear. The reason is considered that the microcracks slightly grow and are visualized or cracks are formed by residual stress at the machined surface.

In the ceramic parts according to the present invention, the radius of curvature of the edge of the machined surface of the grain exposed to the machined surface of the machined body is particularly preferably not less than 0.1 μm. The upper limit for this radius of curvature is practically 2 μm.

The average surface roughness (Ra) of the machined surface of the ceramic part is particularly preferably not more than 1 μm. By so setting, corrosion resistance against the halogen-based corrosive gas tends to be further enhanced. In addition, it is preferable to set the center line depth Rp in the roughness curve of the machined surface of the ceramic part is not more than 1.5 μm. By so setting, the progress of the microcracks from the pits can be suppressed.

The center line depth Rp in the roughness curve will be explained. First, a roughness curve is obtained with respect to a machined surface of a machined body, and a center line of this roughness curve is determined. The center line is a straight line which is in parallel to an average line of the roughness curve and which makes equal areas of zones on opposite sides of the center line which zones are each defined by the roughness curve and the center line. The center line depth in the roughness curve is a distance from the center line to such a highest vertex of a section cut from the roughness curve over a standard length as measured from the center line within that section.

Although the entire ceramic part according to the present invention needs not be made of a ceramic material containing aluminum, at least a portion of the ceramic part which is to contact the halogen-based corrosive gas is preferably made of such a ceramic material containing aluminum.

As the ceramic parts to which the present invention is applicable, mention may be made of devices such as a ceramic heater in which a resistive heating element is buried in a substrate made of a ceramic material containing aluminum, a ceramic electrostatic chuck in which an electrostatically chucking electrode is buried in a substrate, an electrostatic chuck-provided heater in which a resistive heating element and an electrostatically chucking electrode are buried in a substrate, and a high frequency wave generating electrode device in which a plasma-generating electrode is buried in a substrate.

The ceramic parts according to the present invention may be applied to dummy wafers, shadow rings, tubes for generating high frequency plasma, domes for generating high frequency plasma, high frequency wave permeable windows, infrared ray permeable windows, lift pins for supporting semiconductor wafers, shower plates, etc.

In the present invention, it may be that after the sintered body is ground to form a machined surface, the machined body is annealed without mirror polishing the machined surface thereof In this case, generation of particles can be suppressed without performing expensive mirror polishing.

EXAMPLES

In the following, more specific experimental results will be described.

Production of Dense Alumina Sintered Bodies

A mixture was obtained by adding 60 parts by weight of water into 100 parts by weight of alumina powder having the average particle diameter of 0.5 $\mu$m, and a slurry was obtained by mixing in a trommel for 3 hours. Such an amount of polyvinyl alcohol as corresponding to 2 parts by weight was added into this slurry, and spherical granulated particles were formed by a spray dryer.

Granulated particles were charged into a rubber mold, and a molded body was obtained by molding under pressure of 3 tons/cm$^2$ according to cold isostatic press. The thus obtained molded body was heated up to the maximum temperature of 500° C. at a heating rate of 20° C./hour in an atmospheric atmosphere, and held at 500° C. for 15 hours. A sintered body was obtained by holding the dewaxed body at 1600° C. for 3 hours in atmosphere.

The Ra of the thus obtained sintered bodies ranged from 1.4 to 2.7 $\mu$m, and the Rp thereof ranged from 3.8 to 9.6 $\mu$m.

Comparative Example 1

The sintered body was ground by using a diamond rotary grinding stone, thereby obtaining a machined body having a planar shape. With respect to the thus machined body, porosity was measured according to the Archimedes method, and the average surface roughness (Ra) and the average surface roughness Rp in the roughness curve were measured by using a surface roughness meter.

Meanwhile, the machined body was placed as a test piece inside a chamber for a semiconductor-producing apparatus, plasma was generated at a temperature of 400° C. by using NF$_3$ gas, and the test piece was exposed to plasma for 10 hours. A mirror-polished semiconductor wafer was pressed against the test piece having been exposed to the plasma, and a load of 50 g/cm$^2$ was applied thereto. An amount of particles attached to the mirror-polished surface of this semiconductor wafer was measured by using a wafer dust inspector popular in the semiconductor factories.

If the amount of the particles detected from the semiconductor wafer is not more than 30/cm$^2$, the semiconductor does not empirically become defective owing to particles. Accordingly, the machined bodies produced not more than 30 particles/cm$^2$ were judged acceptable. Further, the surface of each machined body before and after exposure to the NF$_3$ was observed with an electron microscope, and results are shown in FIGS. 1 and 2.

As a consequence, the porosity of the machined body was 0.05%, and the Ra and the Rp were 0.4 $\mu$m and 0.7 $\mu$m, respectively. The radius of curvature of the edge of the machined surface of each of the particles was 0.04 $\mu$m. The amount of the particles was 120/cm$^2$.

Invention Example 1

A machined body in Comparative Example 1 was heated up to 1200° C. at a heating rate of 200° C./hour in an atmospheric atmosphere, and held at 1200° C. for 3 hours, thereby obtaining a ceramic part. The porosity of the machined body was 0.05%, and the Ra and the Rp were 0.4 $\mu$m and 0.7 $\mu$m, respectively. The radius of curvature of the edge of the machined surface of each of the grains was 0.07 $\mu$m. The amount of the particles was 60/cm$^2$. Observation of the surface of the ceramic part with the electron microscope enabled fine cracks and numerous particles to be seen.

Invention Example 2

A machined body was heated up to 1300° C. at a heating rate of 200° C./hour in an atmospheric atmosphere, and held at 1300° C. for 3 hours, thereby obtaining a ceramic part.

Figure 5:
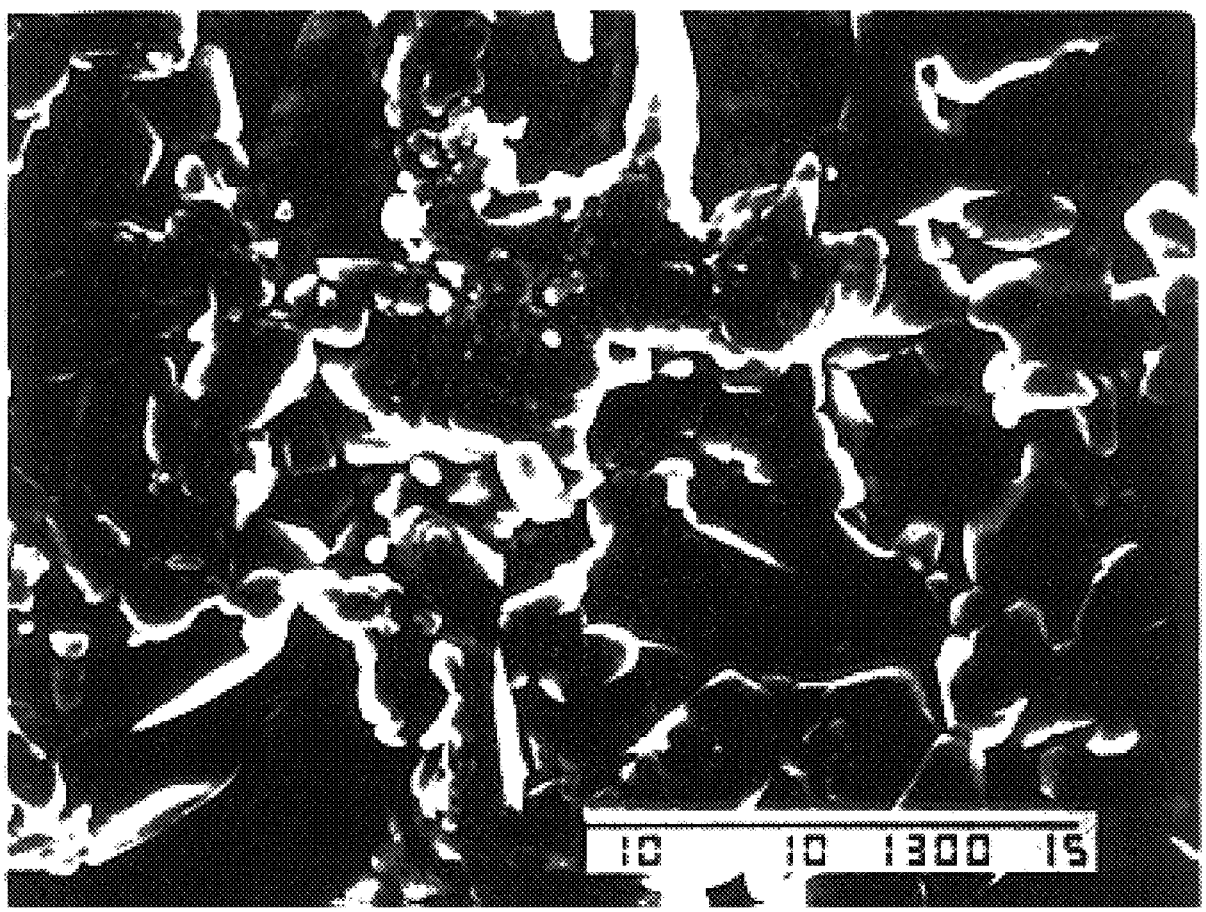
FIG. 5 is an electron micrograph showing the machined surface of a dense alumina part as shown in FIG. 1 after being annealed treated at 1300° C.

The porosity of the ceramic part was 0.05%, and the Ra and the Rp were 0.4 $\mu$m and 0.9 $\mu$m, respectively. The radius of curvature of the edge of the machined surface of each of the grains was 0.13 $\mu$m. The amount of the particles was 30/cm$^2$. An electron micrograph of the ceramic tissue of the machined surface of the ceramic part is shown in FIG. 5. As is seen from FIG. 5, the edges of the grains were made round.

Invention Example 3

A machined body in Comparative Example 1 was heated up to 1500° C. at a heating rate of 200° C./hour in an atmospheric atmosphere, and held at 1500° C. for 3 hours, thereby obtaining a ceramic part.

The porosity of the machined body was 0.05%, and the Ra and the Rp were 0.4 $\mu$m and 1.1 $\mu$m, respectively. The radius of curvature of the edge of the machined surface of each of the grains was 0.8 $\mu$m. The amount of the particles was 10/cm$^2$. An electron micrograph of the machined surface of the ceramic part is shown in FIG. 3. In FIG. 4 is shown an electron micrograph of the machined surface of the ceramic part after exposure to NF$_3$ gas.

Invention Example 4

A machined body in Comparative Example 1 was heated up to 1600° C. at a heating rate of 200° C./hour in an atmospheric atmosphere, and held at 1600° C. for 3 hours, thereby obtaining a ceramic part. The porosity of the machined body was 0.05%, and the Ra and the Rp were 0.4 $\mu$m and 1.4 $\mu$m, respectively. The radius of curvature of the edge of the machined surface of each of the grains was 1.3 $\mu$m. The amount of the particles was 5/cm$^2$.

Invention Example 5

A machined body in Comparative Example 1 was heated up to 1700° C. at a heating rate of 200° C./hour in an atmospheric atmosphere, and held at 1700° C. for 3 hours, thereby obtaining a ceramic part. The porosity of the machined body was 0.04%, and the Ra was 0.4 $\mu$m, whereas the Rp increased to 3.5 $\mu$m. The radius of curvature of the edge of the machined surface of each of the grains was 1.9 $\mu$m. The amount of the particles was 4/cm$^2$.

Production of Aluminum Nitride Sintered Bodies

Y$_2$O$_3$ powder, 0.1% by weight, was added into aluminum nitride powder having the average particle diameter of 0.5

μm, the content of oxygen of not more than 1.3% by weight, and the content of cation impurities of not more than 0.3% by weight. The mixed powders were wet mixed in a trommel with use of an organic solvent for not less than 3 hours, thereby obtaining a slurry. The resulting slurry was granulated into granulated powder by using a spray dryer. A molded body was obtained by press molding the granulated powder under molding pressure of 200 kg/cm$^2$, and the molded body was fired by hot press at a firing temperature of 1800° C. under a molding pressure of 200 kg/cm$^2$, thereby obtaining a sintered body.

The Ra of the thus obtained sintered bodies 1 ranged from 1.2 to 2.5 μm, whereas the Rp thereof ranged from 1.9 to 5.6 μm.

Comparative Example 2

The sintered body was ground by using a diamond rotary grinding stone, thereby obtaining a machined body having a planar shape. With respect to the thus machined body, porosity was measured according to the Archimedes method, and the average surface roughness (Ra) and the center line depth Rp in the roughness curve were measured by using the surface roughness meter. As mentioned above, an amount of particles was also measured after the exposure to $NF_3$ gas.

As a consequence, the porosity of the machined body was 0.01%, and the Ra and the Rp were 0.1 μm and 0.4 μm, respectively. The radius of curvature of the edge of the machined surface of each of the grains was 0.03 μm. The amount of the particles was 210/cm$^2$.

Invention Example 6

A machined body in Comparative Example 1 was heated up to 1700° C. at a heating rate of 200° C./hour in an atmospheric atmosphere, and held at 1700° C. for 4 hours, thereby obtaining a ceramic part. The porosity of the machined body was 0.01%, and the Ra and the Rp were 0.2 μm and 0.6 μm, respectively. The radius of curvature of the edge of the machined surface of each of the grains was 0.2 μm. The amount of the particles was 10/cm$^2$.

Effects of the Invention

As having been explained above, according to the present invention, the generation of the particles from the ceramic parts upon exposure to the corrosive gas can be prevented by appropriately treating the ceramic parts during the production.

What is claimed is:

1. A sintered ceramic part resistive or impervious to a corrosive gas in combination with a semiconductor producing apparatus, comprising:
a semiconductor producing apparatus; and
a sintered ceramic part resistive or impervious to a corrosive gas, a surface of said sintered ceramic part being machined, wherein a portion of said machined surface to be exposed to a halogen-based corrosive gas comprises grains which comprise edges of machined surfaces made round by material transfer, wherein said ceramic part comprises a sintered body made of a ceramic material including aluminum.

2. The combination of claim 1, wherein a radius of curvature of an edge each of the grains exposed to a machining device is not less than 0.1 μm.

3. The combination of claim 1, wherein an average surface roughness (Ra) of the machined surface of said ceramic part is not more than 1 μm, and a center line of depth (Rp) in a roughness curve of said machined surface of said ceramic part is not more than 1.5 μm.

4. A process for producing and using a sintered ceramic part that is resistive or impervious to a corrosive gas, said process comprising: obtaining a machined body having a given shape by at least grinding a surface of a ceramic sintered body; annealing the machined body, and placing the machined body inside a semiconductor producing apparatus.

5. The process set forth in claim 4, wherein a machined surface of the machined body comprises machined surfaces of ceramic grains exposed thereto, and edges of the machined surfaces of the grains are made round by said annealing.

6. The process set forth in claim 4, wherein the machined surface of the machined body is formed by grinding the ceramic sintered body, and the machined body is annealed without mirror-polishing the machined surface of the machined body.

7. The process set forth in claim 4, wherein said ceramic part is a sintered body made of a ceramic material containing aluminum, and said corrosive gas is a halogen-based corrosive gas.

8. The process set forth in claim 7, wherein a temperature of the annealing is not more than To and not less than To–300° C. in which To is a sintering temperature for the sintered body.

9. A method of using in a semiconductor producing apparatus a sintered ceramic part resistive or impervious to a corrosive gas, the method comprising:
providing a semiconductor producing apparatus;
providing in the semiconductor producing apparatus a sintered ceramic part resistive or impervious to a corrosive gas, a surface of said sintered ceramic part being machined, wherein a portion of said machined surface to be exposed to a halogen-based corrosive gas comprises grains which comprise edges of machined surfaces made round by material transfer, wherein said ceramic part comprises a sintered body made of a ceramic material including aluminum.

10. The method of claim 9, wherein the ceramic part has a radius of curvature of an edge each of the grains exposed to a machining device is not less than 0.1 μm.

11. The method of claim 9, wherein the ceramic part has an average surface roughness (Ra) of the machined surface of the machined surface of said ceramic part is not more than 1 μm, and a center line of depth (Rp) in a roughness curve of said machined surface of said ceramic part is not more than 1.5 μm.

* * * * *